US009662564B1

(12) United States Patent
Hensel et al.

(10) Patent No.: US 9,662,564 B1
(45) Date of Patent: May 30, 2017

(54) SYSTEMS AND METHODS FOR GENERATING THREE-DIMENSIONAL IMAGE MODELS USING GAME-BASED IMAGE ACQUISITION

(71) Applicant: GOOGLE Inc., Mountain View, CA (US)

(72) Inventors: Chase Hensel, San Francisco, CA (US); Ze Hong Zhao, Saratoga, CA (US); Liyong Chen, Beijing (CN)

(73) Assignee: Google Inc., Mountain View, CA (US)

( * ) Notice: Subject to any disclaimer, the term of this patent is extended or adjusted under 35 U.S.C. 154(b) by 301 days.

(21) Appl. No.: 14/143,498

(22) Filed: Dec. 30, 2013

Related U.S. Application Data

(60) Provisional application No. 61/776,217, filed on Mar. 11, 2013.

(51) Int. Cl.
*G06T 13/20* (2011.01)
*G06T 17/05* (2011.01)
*A63F 13/00* (2014.01)

(52) U.S. Cl.
CPC .................................... *A63F 13/00* (2013.01)

(58) Field of Classification Search
CPC .... G06T 17/00; G06T 2200/08; G06T 7/0065
See application file for complete search history.

(56) References Cited

U.S. PATENT DOCUMENTS

| 8,267,793 | B2* | 9/2012 | Engolz | 345/158 |
| 8,390,672 | B2* | 3/2013 | Ryu | H04N 5/232 348/36 |
| 8,608,535 | B2* | 12/2013 | Weston | A63F 13/10 463/1 |
| 8,717,412 | B2* | 5/2014 | Linder | G03B 37/00 348/222.1 |
| 2005/0151837 | A1* | 7/2005 | Cutler | G06T 3/0062 348/36 |
| 2006/0105838 | A1* | 5/2006 | Mullen | A63F 13/12 463/31 |
| 2007/0024527 | A1* | 2/2007 | Heikkinen | A63F 13/10 345/9 |
| 2010/0066810 | A1* | 3/2010 | Ryu | H04N 5/232 348/36 |
| 2011/0002543 | A1* | 1/2011 | Almodovar Herraiz | G06Q 30/02 382/190 |

(Continued)

*Primary Examiner* — Barry Drennan
*Assistant Examiner* — Jason Pringle-Parker
(74) *Attorney, Agent, or Firm* — Lerner, David, Littenberg, Krumholz & Mentlik, LLP (57) ABSTRACT

Embodiments include a method of generating a three-dimensional (3D) image model using a game-based image acquisition. The method including determining a location of a user device, identifying images to be acquired to generate a 3D model of an area surrounding the location, displaying a virtual gaming view that includes targets corresponding to locations of the images to be acquired, wherein the targets move within the virtual gaming view relative to movement of the user device, and a goal of a game includes moving the user device to align a field of view of a camera of the user device with the targets, in response to determining that the field of view of the camera aligns with a target, acquiring an image depicting an image scene corresponding to the field of view of the camera, and generating a 3D image model of an area surrounding the location using the image.

20 Claims, 4 Drawing Sheets

(56) References Cited

U.S. PATENT DOCUMENTS

| | | | |
|---|---|---|---|
| 2011/0012989 A1* | 1/2011 | Tseng | G03B 17/20 348/36 |
| 2011/0279697 A1* | 11/2011 | Shingu | H04N 5/2621 348/222.1 |
| 2012/0293549 A1* | 11/2012 | Osako | H04N 13/0275 345/633 |
| 2013/0136341 A1* | 5/2013 | Yamamoto | G06T 17/00 382/154 |
| 2013/0278755 A1* | 10/2013 | Starns | G06T 7/602 348/135 |
| 2014/0118479 A1* | 5/2014 | Rapoport | H04N 1/00183 348/36 |
| 2014/0368620 A1* | 12/2014 | Li | H04N 13/0282 348/50 |

* cited by examiner

SYSTEMS AND METHODS FOR GENERATING THREE-DIMENSIONAL IMAGE MODELS USING GAME-BASED IMAGE ACQUISITION

BACKGROUND OF THE INVENTION

1. Field of the Invention

Embodiments of this invention relate generally to processes for acquiring images and, more particularly, to acquiring images via a gaming environment.

2. Description of the Related Art

Three-dimensional (3D) photography involves capturing a plurality of images surrounding a location. The images can be combined to generate a 3D image model that is a visual reconstruction of a view from the location. A 3D image model may provide a view that is similar to what a person would see when looking up, down and/or around while standing at a location. In traditional systems for generating 3D image models, specialized hardware and/or software is used to capture individual images that can be stitched together to construct a 3D image model. For example, a digital camera may be equipped with video capture capabilities to continuously capture images as the camera rotates through a field of view about a location. The resulting images can, then, be stitched together to construct a 3D image model of the location.

Unfortunately, typical 3D photography techniques are often time-consuming and tedious. Users often do not have the motivation and patience to learn and properly execute a 3D image capture. As a result, users may grow uninterested during a 3D image capture or not know how to correctly execute and image capture, resulting in an insufficient number of images to generate a 3D image model, or low quality images that are not suitable for use in a 3D image model.

SUMMARY OF THE INVENTION

Various embodiments of methods and apparatus for suggesting a meeting place based on two or more locations. In some embodiments, provided is a computer-implemented method for generating a three-dimensional (3D) image model using a game-based image acquisition environment. The method including determining a location of a user device, identifying images to be acquired to generate a 3D model of an area surrounding the location, displaying, in a graphical user interface of the user device, a virtual gaming view that includes one or more targets corresponding to locations of the images to be acquired, wherein a position of the targets move within the virtual gaming view relative to movement of the user device, and wherein a goal of a game includes moving the user device to align a field of view of a camera of the user device with the one or more targets, in response to determining that the field of view of the camera aligns with a first target, acquiring a first image depicting a first image scene corresponding to the field of view of the camera, in response to determining that the field of view of the camera aligns with a second target, acquiring a second image depicting a second image scene corresponding to the field of view of the camera, generating a 3D image model of an area surrounding the location using the first and second images, and storing, in memory, the 3D image model in association with the location.

In some embodiments, provided is a system including one or more memories storing instructions and one or more processors coupled to the one or more memories and configured to execute the instructions stored thereon to cause the following steps for generating a three-dimensional (3D) image model using a game-based image acquisition environment: determining a location of a user device, identifying images to be acquired to generate a 3D model of an area surrounding the location, displaying, in a graphical user interface of the user device, a virtual gaming view that includes one or more targets corresponding to locations of the images to be acquired, wherein a position of the targets move within the virtual gaming view relative to movement of the user device, and wherein a goal of a game includes moving the user device to align a field of view of a camera of the user device with the one or more targets, in response to determining that the field of view of the camera aligns with a first target, acquiring a first image depicting a first image scene corresponding to the field of view of the camera, in response to determining that the field of view of the camera aligns with a second target, acquiring a second image depicting a second image scene corresponding to the field of view of the camera, generating a 3D image model of an area surrounding the location using the first and second images, and storing, in memory, the 3D image model in association with the location.

In some embodiments, provided is a non-transitory computer readable medium comprising program instructions stored thereon that are executable by a processor to cause the following steps for generating a three-dimensional (3D) image model using a game-based image acquisition environment: determining a location of a user device, identifying images to be acquired to generate a 3D model of an area surrounding the location, displaying, in a graphical user interface of the user device, a virtual gaming view that includes one or more targets corresponding to locations of the images to be acquired, wherein a position of the targets move within the virtual gaming view relative to movement of the user device, and wherein a goal of a game includes moving the user device to align a field of view of a camera of the user device with the one or more targets, in response to determining that the field of view of the camera aligns with a first target, acquiring a first image depicting a first image scene corresponding to the field of view of the camera, in response to determining that the field of view of the camera aligns with a second target, acquiring a second image depicting a second image scene corresponding to the field of view of the camera, generating a 3D image model of an area surrounding the location using the first and second images, and storing, in memory, the 3D image model in association with the location.

DETAILED DESCRIPTION

As discussed in more detail below, provided are systems and methods for acquiring images using a virtual gaming environment, and using the acquired images to generate more complex images, such as three-dimensional (3D) image models. A 3D image model may include a visual reconstruction of a location. For example, a 3D image model of a location may depict a view similar to what a person would see when looking up, down and/or around while standing at the location. A 3D image model may be constructed of a plurality of individual images. For example, multiple images may be acquired as a camera rotates through a field of view about a location, and the images may be combined (e.g., via stitched together) to create a 3D image model of the location. A 3D image model may include a full-spherical view about a location. For example, a 3D image model may include a full-spherical 3D field of view (FOV) that is similar to what a person would see if they looked around, up and down when at the location. In some instances, a 3D image model may include a partial-spherical view about a location. For example, a 3D image model may include a upward facing hemispherical 3D field of view that is similar to what a person would see if they looked around and up (but not down) when at the location.

In some embodiments, images that are used construct a 3D image model are acquired with the aid of a virtual gaming environment. For example, a gaming view may be displayed on a screen of a user's camera device (e.g., in a digital camera view finder screen) to encourage the user to aim the camera toward different locations in the surrounding environment. The gaming view may include a dynamic game scene that moves on a screen relative to movement of the device to aid the user in repositioning (i.e., aiming) the camera. For example, as the user rotates the device to the right, the game scene may pan right such that elements in a left portion of the scene move out of view (i.e., off of the screen) and elements of in a right portion of the scene move into view (i.e., onto the screen). The game view may include elements of the game scene overlaid on top of a field of view of the camera (e.g., an image scene), and some of the elements of the game scene may move in coordination with changes in the image scene such they appear to be part of the image scene.

Individual images can be acquired when the camera device is aimed toward the different locations, generating a set of individual images that can be combined to create a 3D image model of the user's environment. In some embodiments, the game scene may include directional elements, such as targets, that encourage the user to aim the camera toward particular locations in the surrounding environment. The targets may be overlaid onto locations within the image scene that need to be photographed (i.e., a location for which an image of the location is needed for construction of the 3D image model). For example, where it is determined that fifty different portions of a surrounding environment need to be photographed to generate the images needed to construct a 3D image model of a location, the game scene may include fifty targets that each correspond to one the fifty different portions of a surrounding environment. The targets may be overlaid onto corresponding locations of an image scene captured by the camera and displayed on the screen of the device. The targets may move relative to the screen, in coordination with the image scene, as the user repositions the device. Thus, when the user is playing the game, the fifty targets may move into an out of view as the user repositions the user device.

To shoot a displayed target, the user may position the device such that a cross-hair, or similar directional aid, displayed in the screen aligns with a target in the scene. The user may shoot a target by repositioning the device such that the cross-hair aligns with the target, and pressing a "shoot" button or similar interactive element. In some instances, a photograph is acquired when the user shoots the target. That is, pressing the shoot button may instigate a process to acquire an image in a manner similar to that of pressing a button when taking a traditional photograph. In some embodiments, an image is acquired when camera is aimed the location of an image to be acquired. For example, an image may be acquired automatically when the cross-hair aligns with the target, regardless of whether or not the user selects a "shoot" button. In some instances, a score is provided to encourage the user to continue to acquire the images. For example, a value may be associated with the targets and, upon the user shooting a target, a total score for the game may be increased by the value. Such a score may provide a challenge that encourages the user to acquire the images in an effort to increase their total score.

Although certain embodiments are described with regard to 3D image models, it will be appreciated that any variety of images can be acquired and constructed using the techniques described herein. For example, individual images acquired using a virtual gaming environment can be used to generate panoramic images.

Figure 1:
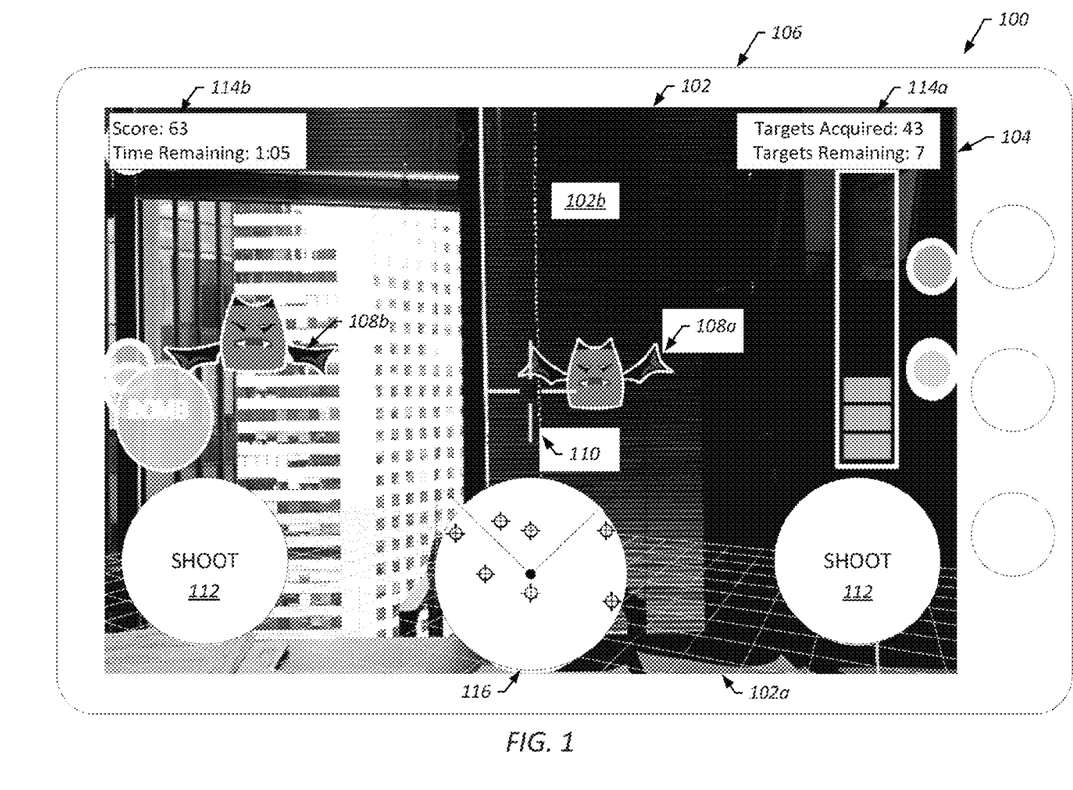
FIG. 1 illustrates an exemplary game-based image acquisition environment in accordance with one or more embodiments of the present technique.

FIG. 1 illustrates a game-based image acquisition environment ("gaming environment") 100 including an exemplary gaming view 102 in accordance with one or more embodiments of the present technique. In the illustrated embodiment, gaming environment 100 includes gaming view 102 displayed on a graphical user interface (e.g., a display screen) 104 of a mobile user device (e.g., a camera phone) 106. Screen 104 may be located on a front side of device 106 and a camera lens may be provided on a backside of device 106. The camera lens may be used to acquire photographic images (e.g., still images or video images) that are displayed to the user via screen 104.

In the illustrated embodiment, gaming view 102 includes a game layer 102a overlaid on an image scene 102b. Game layer 102a includes targets 108 (e.g., 108a and 108b), an aiming aid (e.g., a targeting cross-hair) 110, action buttons (e.g., "shoot" buttons) 112, game status boxes 114 (e.g., 114a and 114b), and a target location guide 116. In the illustrated embodiment, game layer 102a is a transparent overlay provided on top of image scene 102b. Image scene 102b may depict a portion of the surrounding environment that is currently in the field of view of the device's camera lens. For example, in the illustrated embodiment, a camera lens on the backside of device 106 may be pointed toward an exterior office window and image scene 102b may include a two-dimensional photographic representation the office window. Thus, image scene 102b may include a real-time image captured via a camera lens of device 106 and displayed via screen 104 of device 106 (e.g., similar to that typically displayed in a digital camera view finder). Although the illustrated embodiment includes a transparent game layer 102a, embodiments may include a game scene that is not transparent. For example, a non-transparent game scene may include animated generated graphics that fill the screen such that no portion of an image scene is visible on screen 104 while the user is playing the game.

Game layer 102a may be dynamic, including elements that move on screen 104 in coordination with movement of device 106. For example, as the user rotates device 106 to the right, targets 108 may move left such that they appear to move relative to device 106, but fixed with respect to a corresponding portion of the image scene 102b. That is, they may appear to move in coordination with the displayed image scene 102b as if they were an actual element of image scene 102b. Such relative movement may provide a virtual-reality gaming environment such that the user has a sensation of being physically immersed in the game itself. As the user moves device 106 and image scene 102b changes to reflect the current field of view of the camera, certain elements of game layer 102a may not move relative to the screen 104. For example, aiming aid (e.g., targeting cross-hair) 110, action buttons (e.g., "shoot" buttons) 112, game status boxes 114, and target location guide 116 may remain in the same positions. Thus, for example, if the user moves device 106 to the right, image scene 102b and targets 108 may shift a corresponding amount to the left such that targeting cross-hair 110 aligns with (e.g., is superimposed on) target 108a. The user may "shoot" a target by pressing one of the "SHOOT" buttons 112 when targeting cross-hair 110 is aligned with (e.g., superimposed on or near) a target. Thus, for example, if the user were to move device 106 to the right to align targeting cross-hair 110 with target 108a, the user may complete the goal of shooting target 108a by simply pressing one of the "SHOOT" buttons 112 while maintaining alignment of targeting cross-hair 110 with target 108a.

In some embodiments, targets 108 include graphical icons, such a flying characters or similar things, which add to the gaming nature of image acquisition process. In some embodiments, the targets may appear and disappear from game layer 102a (e.g., flash) before being shot to add an additional level of difficulty and variation that can help to keep the user interested and engaged in the game and the image acquisition process.

In some embodiments, targets 108 are provided in locations within game layer 102a that correspond to locations of images that can be acquired for use in constructing a 3D model of the surrounding environment. For example, if generating a spherical 3D image of a location requires fifty images taken at various orientations from the location (e.g., the camera being aimed at fifty different locations evenly spaced/distributed around, above, and below the location), targets 108a and 108b may each correspond to locations of one of the fifty images. Thus, when the user is playing the game and positions device 106 such that targeting cross-hair 110 aligns with a target 108, device 106 may be positioned (e.g., provided at a location and orientation) to acquire one of the fifty images. As a result of playing the game, the user may repeatedly reposition device 106 to acquire some or all of the fifty images. That is, the user may acquire the images needed for generating a 3D image model of the location by simply playing the game. Although fifty is provided as an exemplary number of images for the purpose of illustration, embodiments may include any suitable number of images (e.g., a suitable number of images to construct a 3D image model or other image).

In some embodiments, an image may be acquired when the user shoots a target. For example, upon the user moving device 106 such targeting cross-hair 110 aligns with target 108a, and pressing a "SHOOT" button 112, an image corresponding to the currently displayed image scene 102b may be acquired via the camera of device 106. In some embodiments, the image may be acquired when the user simply aims the device in a position corresponding to an image to be acquired. For example, where target 108a is provided in a location that corresponds to a location of one of the fifty images for generating a spherical 3D image of the location, the camera may be automatically activated to acquire an image when targeting cross-hair 110 aligns with target 108a, regardless of whether or not the user selects a "SHOOT" button 112. Thus, images may be acquired automatically when the position of device 106 corresponds to a location of an image to be acquired.

Figure 2:
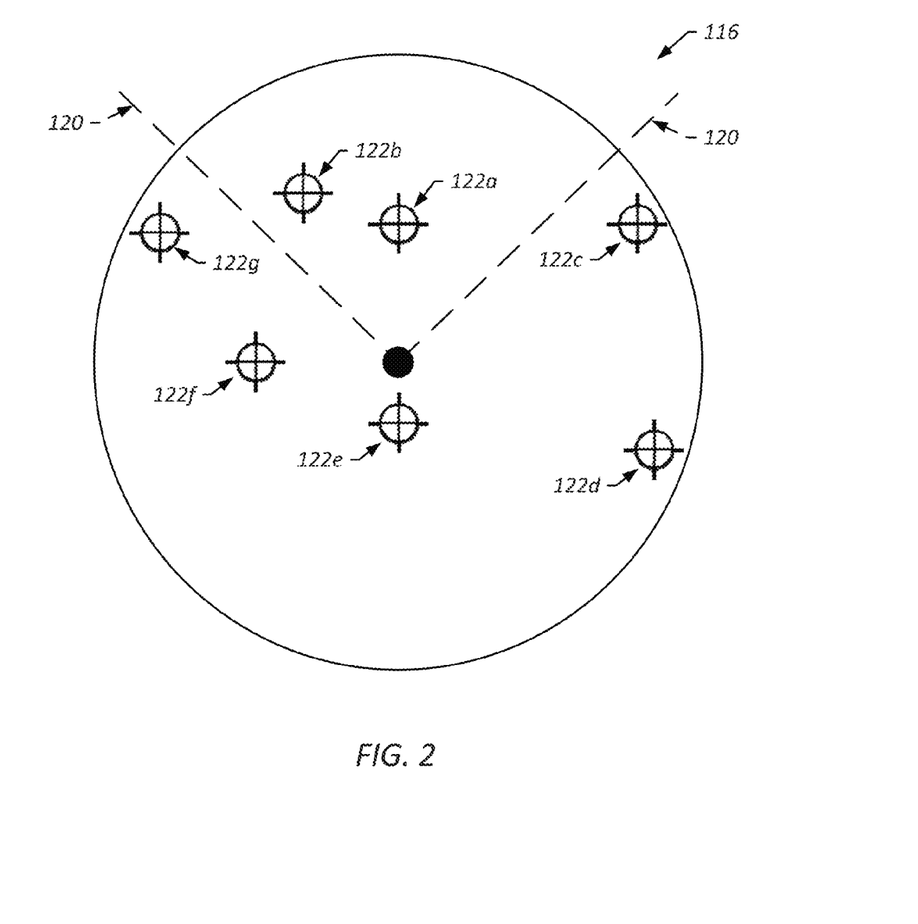
FIG. 2 is a detailed illustration of a target location guide of FIG. 1 in accordance with one or more embodiments of the present technique.

FIG. 2 is a detailed illustration of target location guide 116 of FIG. 1. In some embodiments, target location guide 116 provides directional information to assist users in locating targets that need to be acquired. For example, in the illustrated embodiment, target location guide 116 includes a dashed lines 120 corresponding to the current field of view displayed on screen 104, along with a plurality of target markers 122 (e.g., target markers 122a-122g) corresponding to relative locations of targets 108. In the illustrated embodiment, target markers 122a and 122b (falling within the dashed lines) correspond to locations of targets 108a and 108b, respectively. Target markers 122c-122g may correspond to targets that are not currently in the field of view and, thus may require the user to reposition device 106 to bring them into the field of view. In some embodiment, target location guide 116 may be indicative of the relative vertical location of targets. For example, markers 122 that are closer to a center of target location guide 116 may be lower in a field of view and markers 122 that are farther from a center of target location guide may be higher in a field of view. Thus, for example, the user may rotate device 106 about ninety degrees to the right with an upward orientation to bring targets 108 corresponding makers 122c and 122d into view on screen 104, rotate device 106 about one-hundred eighty degrees with a downward orientation to bring a target 108 corresponding maker 122e into view on screen 104, rotate device 106 about ninety degrees to the left to bring a target 108 corresponding maker 122f into view on screen 104, and/or rotate device 106 about ninety degrees to the left with an upward orientation to bring a target 108 corresponding maker 122g into view on screen 104.

In some embodiments, game status boxes 114 display information relating to the current status of the game. For example, in the illustrated embodiment, a first game status box 114a displays the number of targets that have been acquired (i.e., shot) and a number of target remaining (i.e., that need to be shot). In the illustrated embodiment, a second game status box 114b displays a total score along with an amount of time remaining In some embodiments, the score is updated as the user acquires targets or accomplishes other goals. For example, where a target has a value of ten points, upon the user shooting the target, the score may be increased by ten points. In some embodiments, the score may be decreased if the user does not accomplish a goal or engages in an undesired action. For example, the score may be decreased by three points each time the user shoot a "bomb" displayed in the game scene, or decreased by one point each time the user shoots at, and misses a target.

Accordingly, a user may be able to acquire images for use in constructing a 3D image model of a location by playing a game on their mobile device. For example, the user may open the game on their device while sitting in their office (or other location), a game scene may be displayed that includes a number of targets corresponding to locations of images to be acquired to generate a 3D image model of their current location (e.g., a 3D image model of the user's office), the user may repeatedly reposition their device to shoot targets and acquire a corresponding set of images, and some or all of the images can be combined (e.g., stitched together) to generate a 3D image model of the location (e.g., a 3D image model of the user's office). The image can be displayed to the user as a reward for completing the game. In some embodiments, the set of images and/or the resulting 3D image model can be stored and/or provided to a third party with the user's consent. Providing sets of images and 3D image models may be particularly useful in the context of generating a database of 3D image models for a plurality of locations. For example, where a mapping service provider serves 3D image models for display to users that submit queries about locations, the service provider may collect the sets of images and 3D models generated as a result of any number of users engaging in gamed-based image acquisition while in a variety of different locations. For example, where a number of users engage in game-based image acquisition while at various locations inside of a shopping mall, the mapping service provider may collect the images and/or the 3D image models generated as a result of the game-based acquisitions, and use some or all of the images and/or 3D image models to generate one or more 3D images models for the interior of the shopping mall that can be used to service request. For example, where a user request information about a store in the mall, the service provider may serve a 3D image model corresponding to the location of the store. The requesting user can, then, become acquainted with the store location by simply viewing the 3D image model.

Figure 3:
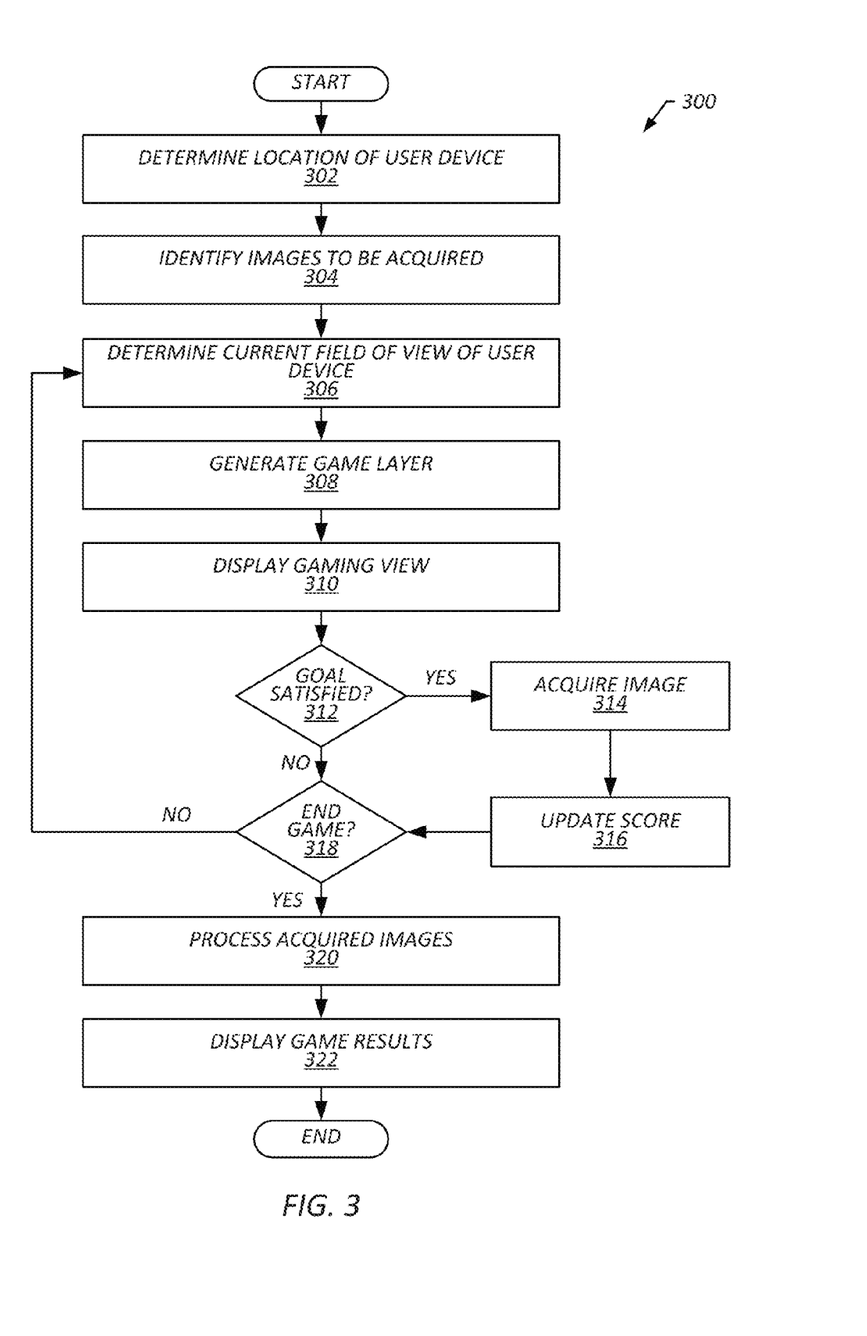
FIG. 3 is a flowchart that illustrates a method of employing game-based image acquisition to generate a three-dimensional (3D) model of a location in accordance with one or more embodiments of the present technique.

FIG. 3 is a flowchart that illustrates a Method 300 of employing game-based image acquisition to generate a three-dimensional (3D) image model of a location in accordance with one or more embodiments of the present technique. Method 300 may be invoked (e.g., started) by a user opening a game-based image acquisition application on a mobile user device. For example, while sitting in his/her office, a user may launch a game that includes shooting targets in a virtual-reality environment.

Method 300 may include determining a location of the user device (block 302). In some embodiments, the location of the user device is determined via an integrated positioning device. For example, a location of user device 106 may be acquired using a global positioning system (GPS) device integrated within device 106. In some embodiments, the location of the user device may be acquired via an Internet Protocol (IP) address lookup. For example, where device 106 has an IP address assigned to it or otherwise associated with it, and a location is associated with the IP address, it may be determined that user device 106 is located at or near the location associated with the IP address.

Method 300 may include identifying images to be acquired (block 304). In some embodiments, identifying images to be acquired may include identifying images that need to be acquired to generate a 3D image model of a location of the user device. For example, if no images have been acquired at the determined location, and fifty images are required to generate a 3D image model of the location, identifying images to be acquired may include identifying the fifty images. As a further example, if ten of the fifty images have been acquired previously, identifying images to be acquired may include identifying the forty remaining images that need to be acquired. Each of the images may include a portion of the overall field of view that is ultimately represented by the 3D image model.

Method 300 may include determining a current field of view of the user device (block 306). In some embodiments, determining a current field of view of the user device may include determining a current position (e.g., location and/or orientation) of the user device and/or the bounds of an image scene that is captured via a camera of the user device based on the current position. For example, if user device 106 is directed in a substantially horizontal direction (e.g., as depicted in FIG. 1) with no rotation about a vertical axis (e.g., the field of view is centered at about zero degrees), and the span of field of view is about ninety degrees in the horizontal direction (as illustrated by the dashed lines of target location guide 116) and about sixty degrees in the vertical direction, it may be determined that the bounds of the current field of view extend from −315° to +45° in the horizontal direction and from −30° to +30° in the vertical direction. In some embodiments, the orientation of a user device is determined using a gyroscope (e.g., integrated into user device 106), or similar positioning device. The determined orientation may be combined with the device's current location (e.g., obtained as described above) to determine the current position of the user device.

Method 300 may include generating a game layer (block 308). In some embodiments, generating a game layer includes generating a display layer that corresponds to the current field of view. For example, when the user device is positioned as depicted in FIG. 1, generating a game layer may include generating game layer 102a, including targets 108 (e.g., 108a and 108b), targeting cross-hair 110, "SHOOT" buttons 112, game status boxes 114, and target location guide 116.

Method 300 may include displaying a game view on the user device (block 310). In some embodiments, displaying the game view on the user device includes displaying the game layer overlaid on the current scene view. For example, displaying a game view on user device 106 may include displaying a game view, including game layer 102a as a transparent overlay of image scene 102b, on screen 104, as depicted in FIG. 1.

Method 212 may include determining whether a goal has been satisfied (block 312), and, if a goal has been satisfied, acquiring an image (block 314). In some embodiments, a goal may include shooting a target, or otherwise aligning the field of view of the camera with the location of an image to be acquired. Thus, for example, a first image may be acquired when the user shoots target 108a (e.g., by pressing a "SHOOT" button 112 when the user positions device 106 such that targeting cross-hair 110 aligns with target 108a) or may be acquired automatically when the user simply positions device 106 such that targeting cross-hair 110 aligns with target 108a. As a further example, a second image may be acquired when the user shoots target 108b or simply positions device 106 such that targeting cross-hair 110 aligns with target 108b. Other images (e.g., the other forty-eight images required for a 3D image model of the location) may be acquired in a similar manner.

In some embodiments, acquiring an image includes capturing a photographic image of the current field of view of the camera. For example, where user shoot target 108a, the camera of device 106 may be employed to capture a still image of the current field of view (e.g., an image that is substantially similar to that of image scene 102b—although being shifted slightly to the right as a result of aligning targeting cross-hair 110 with target 108a) and store the image in a memory of device 106. In some embodiments, the acquired image may be transmitted to and/or stored by another network entity, such as a network server.

Method 300 may include updating a score (block 316). In some embodiments, updating a score incudes adjusting a game score to reflect a goal being satisfied. For example, where target 108a has a value of ten points, upon the user shooting target 108a, the game score may be increased by ten points (e.g., from "63" to "73"). In some embodiments, the score may be decreased if the user does not accomplish a goal or engages in an undesired action. For example, the score may be decreased by three points each time the user shoot a "bomb" displayed in the game scene, or decreased by one point each time the user shoots and misses a target. In some embodiments, updating a game score includes updating game status information displayed to the user. For example, upon the user shooting target 108a, the total score that is displayed in game status box 114b may be adjusted from "63" to "73", the number of targets that have been acquired (i.e., shot) that is displayed in game status box 114a may be adjusted from "43" to "44", the number of targets remaining (i.e., that need to be shot) that is displayed in game status box 114a may be adjusted from "7" to "6", and target marker 122a may be removed from display in target location guide 116.

After updating the score (block 316), or determining that a goal has not been satisfied (block 312), method 300 may proceed to determining whether the game has ended (block 318). The game may end, for example, in response to the user selecting an option to "end" the game, the user satisfying all of the required goals of the game (e.g., shooting all fifty targets), the user failing to accomplish the required goals (e.g., exceeding the time limit prior to acquiring the all fifty targets, running out of bullets, or the like). If it is determined that the game has not ended, method 300 may cycle through another iteration of determining a current field of view, generating a corresponding game layer, displaying an updated game view, checking to see if a goal was satisfied, and so forth. Such iterations may allow the user to shoot other targets and, thus, acquire more images for use in constructing a 3D image model of the location. For example, in one of the iterations after shooting target 108a, the user may rotate device 106 to the left such that the updated game layer 102a includes targeting cross-hair 110 aligned with target 108b, and the user may press a "SHOOT" button 112, thereby resulting in acquisition of an image of the current field of view (e.g., an image that is substantially similar to that of image scene 102b-although being shifted slightly to the left as a result of aligning targeting cross-hair 110 with target 108b) and updating of scores and other game information. Such iteration may continue as the user attempts to shoot each of the targets and, thus, capture the remaining images to be acquired.

Method 300 may include processing the acquired images (block 320). In some embodiments, processing the acquired images includes stitching together, or otherwise combining, some or all of the acquired images to generate a 3D image model, or at least a portion of a 3D image model, of the location. For example, where the user shot all fifty targets 108 while playing the game, resulting in acquisition of a set of fifty corresponding images, the fifty images may be stitched together to generate a spherical 3D image model of the user's office. Processing the acquired images may include processing storing the 3D image model. For example, the 3D image model may be stored in a memory of device 106 and/or datastore 410 in association with the location determined at block 302.

Method 300 may include displaying the game results (block 322). In some embodiments, displaying the game results may include displaying resulting game statistics. For example, upon the game ending, a statistics screen that includes a total score, the time used, the number of shots fired, the number of missed shots, the number of on-target shots, and so forth may be displayed on screen 104. In some embodiments, displaying the game results may include displaying the resulting 3D image model. For example, the statistics screen may include a user selectable option to view the 3D image model. Upon selection of the option to view the 3D image model, a portion of the 3D image model may be displayed on screen 104. The user may be provided the ability to pan/zoom across the 3D image model. Such an interactive display of a spherical 3D image model may enable the user to view images that are similar to what a person would see if they looked up, down or around when in the location. For example, the spherical 3D image model may enable a user to pan/zoom to see the interior of the user's office, including the office's floor, walls, door, windows, and ceiling.

Method 300 is an exemplary embodiment of a method that may be employed in accordance with the techniques described herein. Method 300 may be modified to facilitate variations of its implementations and uses. Method 300 may be implemented in software, hardware, or a combination thereof. Some or all of method 300 may be implemented by one or more of the modules/applications described herein, such as game-based image acquisition module 412 and/or application 408 depicted and described in more detail below with regard to FIG. 4. The order of the steps of method 300 may be changed, and various elements may be added, reordered, combined, omitted, modified, etc.

Figure 4:
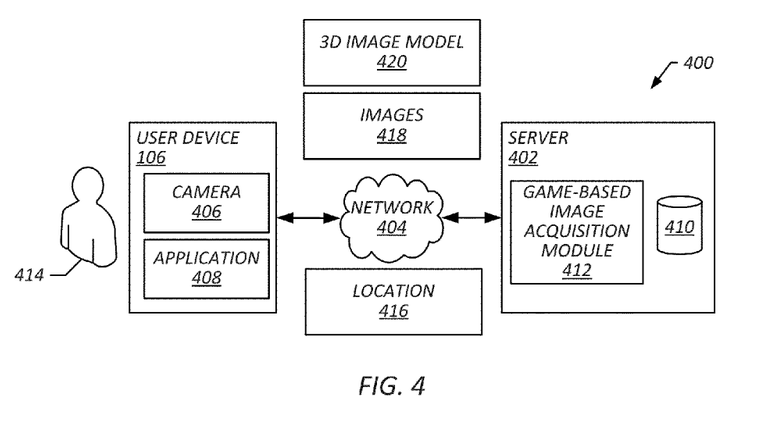
FIG. 4 is a block diagram that illustrates a modeling environment in accordance with one or more embodiments of the present technique.

FIG. 4 is a block diagram that illustrates an exemplary game-based image acquisition environment (e.g., a gaming environment) 400. Environment 400 includes a server 402 and user device 106 communicatively coupled via a network 404.

Network 404 may include an electronic communications network, such as the Internet, a local area network (LAN), a wide area (WAN), a cellular communications network or the like. Network 404 may include a single network or combination of networks.

User device 106 may include any variety of electronic devices. For example, user device 106 may include a personal computer (e.g., a desktop computer), a mobile computing device (e.g., a laptop, tablet computer, a cellular phone, a personal digital assistant (PDA), etc.), or the like. In some embodiments, user device 106 is a client of server 402. In some embodiments, user device 106 includes various input/output (I/O) interfaces, such as a graphical user interface (e.g., display screen 104), an image acquisition device (e.g., a camera 406) an audible output user interface (e.g., speaker), an audible input user interface (e.g., microphone), a keyboard, a pointer/selection device (e.g., mouse, trackball, touchpad, touchscreen, stylus, etc.), a printer, or the like. In some embodiments, user device 106 includes general computing components and/or embedded systems optimized with specific components for performing specific tasks. In some embodiments, user device 106 includes applications (e.g., a game-based image acquisition application) 408. Application 408 may include one or more modules having program instructions that are executable by a computer system to perform some or all of the functionality described herein with regard to user device 106. For example, application 408 may include program instructions that are executable by a computer system to perform some or all of the steps of method 300. In some embodiments, user device 106 includes a computer system similar to that of computer system 1000 described below with regard to at least FIG. 5.

Server 402 may include a network entity that serves requests by client entities. For example, server 402 may serve requests generated by user device 106. In some embodiments, server 402 hosts a content site, such as a website, a file transfer protocol (FTP) site, an Internet search website or other source of network content. In some embodiments, server 402 includes a gaming server. Server 402 may serve gaming content or the like in response to requests generated by user device 106. In some embodiments, server 402 includes or otherwise has access to data store 410. Data store 410 may include a database or similar data repository. Data store 410 may include an image repository for storing images, including 3D image models of various locations.

In some embodiments, server 402 includes game-based image acquisition module 412. Module 412 may include program instructions that are executable by a computer system to perform some or all of the functionality described herein with regard to server 402. Module 412 may include program instructions that are executable by a computer system to perform some or all of the steps of method 300. In some embodiments, server 402 includes a computer system similar to that of computer system 1000 described below with regard to at least FIG. 5. Although server 402 is represented by a single box in FIG. 4, server 402 may include a single server (or similar system), or a plurality of servers (and/or similar systems). For example, server 402 may include a plurality of different servers (and/or similar systems) that are employed individually or in combination to perform some or all of the functionality described herein with regard to server 402.

In some embodiments environment 400 is used to employ techniques described herein (e.g., the steps of method 300). For example, a user 414 may open a game (e.g., a game-based image acquisition application 408) via access device 106. Upon opening the game, user device 106 may obtain its location (e.g., a set of geographic coordinates corresponding to the location of the user's office) 416, identify images to be acquired (e.g., the fifty images that are required to generate a spherical 3D image model of the location), activate camera 406 to begin acquiring an image scene for display on screen 104, generate a game layer corresponding to a current field of view of the user device (e.g., as depicted in FIG. 1), display a current gaming view (e.g., including the game layer overlaid on the current image scene, and monitoring user interaction with device 106. User device 106 may update the displayed image scene, update the displayed game layer, update game scores, and/or and acquires images based on the user interactions. For example, when the user repositions device 106, the displayed game layer may be in coordination with the image scene to reflect movement of device 106. When a user shoots a target, device 106 may acquire an image 418 of the current field of view using camera 306. In some embodiment, device 106 may store acquired images 418 locally (e.g., in a memory of device 106) and/or transmit images 418 to another network entity, such as server 402. Server 402 may store (e.g., in data store 410) images 418 in association with a location 416 of access device 106. In some embodiments, when the game has ended, device 106 may process the individual images 418 (e.g., stitch images 418 together) to generate a 3D image model 420 of the location. Device 106 may display, via screen 104, game results, such as a statistics screen that includes total score, time used, shots fired, missed shots, on-target shots, and/or display the 3D image model 420. In some embodiment, device 106 may store 3D image model 420 locally (e.g., in a memory of device 106) and/or transmit 3D image model 420 to another network entity, such as server 402. Server 402 may store 3D image model 420 (e.g., in data store 410) in association with location 416.

In some embodiments, some or all of the steps may be provided by a remote network entity, such as server 402. For example, game-based image acquisition module 412 may process the individual images 418 to generate a 3D image model 420. Server 402 may transmit 3D image model 420 to access device 106 for display to user 414. Such off-loading of task may optimize the performance of system 400. For example, server 402 may have specialized image processing capabilities that can assist in generating 3D image model 420, thereby helping to reduce the processing burden on access device 106.

Exemplary Computer System

Figure 5:
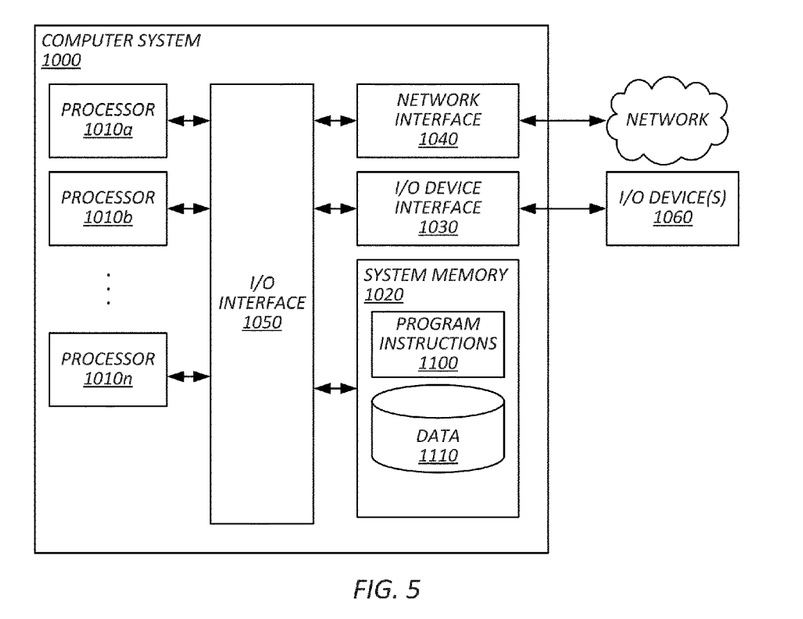
FIG. 5 is a block diagram that illustrates an exemplary computer system in accordance with one or more embodiments of the present technique.

FIG. 5 is a block diagram that illustrates an exemplary computer system 1000. Various portions of systems and methods described herein, may include or be executed on one or more computer systems similar to system 1000. For example, server 402 and/or user device 106 may include a configuration similar to at least a portion of computer system 1000. Further, methods/processes/modules described herein (e.g., module 412 and/or application 408) may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof, or the like. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium having program instructions stored thereon that are executable by a computer processor (e.g., one or more of processors 1010a-1010n) to cause some or all of the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method of generating a three-dimensional (3D) image model using a game-based image acquisition environment, the method comprising:
   identifying a game score of a game;
   determining an initial geographical location of a user device;
   identifying images to be acquired to generate a 3D image model of an area surrounding the location;
   displaying, in a graphical user interface of the user device, a virtual gaming view comprising two or more targets corresponding to locations of the images to be acquired, each target comprising a graphical object, wherein a position of the targets move within the virtual gaming view relative to movement of the user device, and wherein a goal of the game includes moving the user device to align a field of view of a camera of the user device with the one or more targets;
   in response to determining that the field of view of the camera aligns with a first target, acquiring a first image depicting a first image scene corresponding to the field of view of the camera;
   in response to determining that the field of view of the camera aligns with a second target, acquiring a second image depicting a second image scene corresponding to the field of view of the camera;
   generating the 3D image model of the area surrounding the location using the first and second images;
   storing, in memory, the 3D image model in association with the location; and
   when it is determined that the field of view of the camera aligns with a given one of the two or more targets, updating the game score of the game based on the alignment.

2. The method of claim 1, further comprising:
   determining a first updated game score based on the acquisition of the first image;
   displaying the first updated score in the virtual gaming environment;
   determining a second updated game score based on the acquisition of the second image; and
   displaying the second updated score in the virtual gaming environment.

3. The method of claim 1, wherein determining that the field of view of the camera aligns with a target comprises determining a position of the user device, and determining that the camera is directed to a location of an image to be acquired based at least in part on the position of the user device.

4. The method of claim 1, wherein determining that the field of view of the camera aligns with a target is provided in response to a user input to engage a target.

5. The method of claim 3, wherein the user input to engage a target comprises user selection of a shoot button configured to simulate shooting of the target.

6. The method of claim 1, further comprising displaying a target location guide indicating locations of targets relative to a current position of the user device, wherein the target location guide is updated in response to movement of the user device.

7. The method of claim 1, wherein generating a 3D image model of an area surrounding the location using the first and second images comprises stitching together a plurality of images to generating the 3D image model of an area surrounding the location, the plurality of images including the first and second images.

8. A system comprising:
   one or more memories storing instructions; and
   one or more processors coupled to the one or more memories and configured to execute the instructions stored thereon to cause the following steps for generating a three-dimensional (3D) image model using a game-based image acquisition environment:
   identifying a game score of a game;
   determining an initial geographical location of a user device;
   identifying images to be acquired to generate the 3D image model of an area surrounding the location;
   displaying, in a graphical user interface of the user device, a virtual gaming view comprising two or more targets corresponding to locations of the images to be acquired, each target comprising a graphical object, wherein a position of the targets move within the virtual gaming view relative to movement of the user device, and wherein a goal of the game includes moving the user device to align a field of view of a camera of the user device with the one or more targets;
   in response to determining that the field of view of the camera aligns with a first target, acquiring a first image depicting a first image scene corresponding to the field of view of the camera;
   in response to determining that the field of view of the camera aligns with a second target, acquiring a second image depicting a second image scene corresponding to the field of view of the camera;

generating the 3D image model of the area surrounding the location using the first and second images;

storing, in memory, the 3D image model in association with the location; and when it is determined that the field of view of the camera aligns with a given one of the two or more targets, updating the game score of the game based on the alignment.

9. The system of claim 8, the steps further comprising:

determining a first updated game score based on the acquisition of the first image;

displaying the first updated score in the virtual gaming environment;

determining a second updated game score based on the acquisition of the second image; and displaying the second updated score in the virtual gaming environment.

10. The system of claim 8, wherein determining that the field of view of the camera aligns with a target comprises determining a position of the user device, and determining that the camera is directed to a location of an image to be acquired based at least in part on the position of the user device.

11. The system of claim 8, wherein determining that the field of view of the camera aligns with a target is provided in response to a user input to engage a target.

12. The system of claim 11, wherein the user input to engage a target comprises user selection of a shoot button configured to simulate shooting of the target.

13. The system of claim 8, the steps further comprising displaying a target location guide indicating locations of targets relative to a current position of the user device, wherein the target location guide is updated in response to movement of the user device.

14. The system of claim 8, wherein generating a 3D image model of an area surrounding the location using the first and second images comprises stitching together a plurality of images to generating the 3D image model of an area surrounding the location, the plurality of images including the first and second images.

15. A non-transitory computer readable medium comprising program instructions stored thereon that are executable by a processor to cause the following steps for generating a three-dimensional (3D) image model using a game-based image acquisition environment:

identifying a game score of a game;

determining an initial geographical location of a user device;

identifying images to be acquired to generate a 3D image model of an area surrounding the location;

displaying, in a graphical user interface of the user device, a virtual gaming view comprising two or more targets corresponding to locations of the images to be acquired, each target comprising a graphical object, wherein a position of the targets move within the virtual gaming view relative to movement of the user device, and wherein a goal of the game includes moving the user device to align a field of view of a camera of the user device with the one or more targets;

in response to determining that the field of view of the camera aligns with a first target, acquiring a first image depicting a first image scene corresponding to the field of view of the camera;

in response to determining that the field of view of the camera aligns with a second target, acquiring a second image depicting a second image scene corresponding to the field of view of the camera;

generating the 3D image model of the area surrounding the location using the first and second images;

storing, in memory, the 3D image model in association with the location; and when it is determined that the field of view of the camera aligns with a given one of the two or more targets, updating the game score of the game based on the alignment.

16. The medium of claim 15, the steps further comprising:

determining a first updated game score based on the acquisition of the first image;

displaying the first updated score in the virtual gaming environment;

determining a second updated game score based on the acquisition of the second image; and displaying the second updated score in the virtual gaming environment.

17. The medium of claim 15, wherein determining that the field of view of the camera aligns with a target comprises determining a position of the user device, and determining that the camera is directed to a location of an image to be acquired based at least in part on the position of the user device.

18. The medium of claim 15, wherein determining that the field of view of the camera aligns with a target is provided in response to a user input to engage a target.

19. The medium of claim 18, wherein the user input to engage a target comprises user selection of a shoot button configured to simulate shooting of the target.

20. The medium of claim 15, the steps further comprising displaying a target location guide indicating locations of targets relative to a current position of the user device, wherein the target location guide is updated in response to movement of the user device.

* * * * *